United States Patent
Barkie et al.

(10) Patent No.: US 10,708,370 B2
(45) Date of Patent: Jul. 7, 2020

(54) METHOD AND SYSTEM FOR ASSIGNING PRIVILEGES IN AN ONLINE COMMUNITY OF NEWS CONTENT READERS AND AUTHORS

(71) Applicant: International Business Machines Corporation, Armonk, NY (US)

(72) Inventors: Eric J. Barkie, Cary, NC (US); Scott C. Bosworth, Apex, NC (US); Benjamin L. Fletcher, Denver, CO (US); Jacquelyn A. Martino, Cold Spring, NY (US)

(73) Assignee: International Business Machines Corporation, Armonk, NY (US)

( * ) Notice: Subject to any disclaimer, the term of this patent is extended or adjusted under 35 U.S.C. 154(b) by 150 days.

(21) Appl. No.: 15/345,810

(22) Filed: Nov. 8, 2016

(65) Prior Publication Data

US 2018/0129814 A1    May 10, 2018

(51) Int. Cl.
  *H04L 29/08* (2006.01)
  *G06Q 50/00* (2012.01)
  *G06F 16/9535* (2019.01)

(52) U.S. Cl.
  CPC .......... *H04L 67/22* (2013.01); *G06F 16/9535* (2019.01); *G06Q 50/01* (2013.01)

(58) Field of Classification Search
  CPC ............ G06F 21/604; G06F 17/30867; G06F 16/9535; H04L 67/22
  See application file for complete search history.

(56) References Cited

U.S. PATENT DOCUMENTS

| | | | |
|---|---|---|---|
| 7,698,337 B2 | 4/2010 | Yoon | |
| 8,195,522 B1 | 6/2012 | Sonne et al. | |
| 2001/0044795 A1* | 11/2001 | Cohen | G06F 17/30699 |
| 2003/0037034 A1* | 2/2003 | Daniels | G06Q 10/087 |
| 2005/0055357 A1* | 3/2005 | Campbell | G06F 8/61 |
| 2005/0289039 A1* | 12/2005 | Greak | G06Q 30/0609 705/37 |
| 2007/0150398 A1* | 6/2007 | Rossen | G06Q 40/06 705/36 R |

(Continued)

OTHER PUBLICATIONS

MyBB Documentation—Moderators, https://docs.mybb.com/1.6/Admin-CP-Moderators/, Oct. 1, 2015. (Year: 2015).*

(Continued)

*Primary Examiner* — Jay A Morrison
(74) *Attorney, Agent, or Firm* — Terrile, Cannatti & Chambers, LLP; Michael Rocco Cannatti

(57) ABSTRACT

A method, system and a computer program product are provided for organizing an online community based on subject-related contributions by classifying user contributions $C_i$ from a plurality of users in a community according to a plurality of subjects $S_j$ to identify subjects in each user contribution, assembling one or more community quality values for each user that generated the user contribution, ranking the plurality of users based on the one or more community quality values for each user that generated the user contribution, and assigning privileges in a hierarchy of privileges to each user in the community based on the ranking of the plurality of users.

18 Claims, 3 Drawing Sheets

(56) References Cited

U.S. PATENT DOCUMENTS

| | | | |
|---|---|---|---|
| 2011/0112869 A1* | 5/2011 | Greak | G06Q 30/06 705/4 |
| 2012/0215773 A1* | 8/2012 | Si | G06F 17/30864 707/723 |
| 2013/0091141 A1* | 4/2013 | Mishra | G06Q 50/01 707/741 |
| 2013/0262258 A1 | 10/2013 | Jennings | |
| 2013/0298030 A1* | 11/2013 | Nahumi | H04W 4/21 715/733 |
| 2013/0325550 A1* | 12/2013 | Varghese | H04W 4/21 705/7.31 |
| 2014/0101197 A1* | 4/2014 | Charytoniuk | G06F 17/30867 707/770 |
| 2014/0181196 A1 | 6/2014 | Sullivan | |
| 2014/0297765 A1* | 10/2014 | Beckley | H04L 51/32 709/206 |
| 2014/0317108 A1 | 10/2014 | Howe et al. | |
| 2015/0032737 A1 | 1/2015 | Badenes et al. | |
| 2015/0032751 A1 | 1/2015 | Ting et al. | |
| 2015/0154289 A1 | 6/2015 | Revesz et al. | |
| 2015/0293921 A1 | 10/2015 | Albouyeh et al. | |
| 2015/0331865 A1 | 11/2015 | Bank et al. | |
| 2015/0363895 A1 | 12/2015 | Zawel | |
| 2016/0110899 A1* | 4/2016 | Kalb | G06F 17/24 715/202 |
| 2016/0155181 A1* | 6/2016 | Romaya | G06Q 30/0282 705/26.63 |
| 2016/0321337 A1* | 11/2016 | Lee | G06Q 10/06 |
| 2017/0012913 A1* | 1/2017 | Lohani | H04L 67/306 |
| 2017/0272396 A1 | 9/2017 | Chhaya et al. | |

OTHER PUBLICATIONS

Wei et al., "Motivating user contributions in online knowledge communities: virtual rewards and reputation," In 2015 48th Hawaii International Conference on System Sciences, Jan. 2015, IEEE. (Year: 2015).*

High, R., "The Era of Cognitive Systems: An Inside Look at IBM Watson and How it Works," IBM Redbooks, 2012.

Yuan et al., "Watson and Healthcare," IBM developerWorks, 2011.

IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.

Shin, Hyoseop et al., Ranking User-Created Contents by Search User's Inclination in Online Communities, 18th International World Wide Web Conference, WWW Dec. 2009.

L'Huillier, Gaston et al., Topic-Based Social Network Analysis for Virtual Communities of Interests in the Dark Web, ACM SIGKDD Explorations Newsletter 12.2, pp. 66-73, 2011.

* cited by examiner

METHOD AND SYSTEM FOR ASSIGNING PRIVILEGES IN AN ONLINE COMMUNITY OF NEWS CONTENT READERS AND AUTHORS

BACKGROUND OF THE INVENTION

The present application relates generally to an improved data processing apparatus and method for analyzing online content. In one aspect, the present application relates to evaluating and ranking content creators based on content quality indications from user activity and feedback.

A variety of online communities that are designed to facilitate/enable a community of users to collaboratively generate content. These include forums, file sharing services, collaboratively edited pages such as wikis, and various social media outlets, such as Wikipedia, reddit, FourSquare, Twitter. For example, Wikipedia content is essentially the structured output of a community of self-organized volunteers who have collaboratively written, edited, and published Encyclopedia-style content using underlying design and technologies that are structured or chosen to facilitate a specific output of Encyclopedia-style articles from the community. Another example is reddit, a social media, social news aggregation, web content rating, and discussion website wherein registered community members can share content, such as text posts or direct links, for evaluation by registered uses who vote submissions with "upvotes" or "downvotes" to organize the posts and determine their ranking and position on the front page of the website. There are also open source software communities in which higher quality contributions, as measured by commits to the project, are given increased influence over the direction of the project. In each of these examples, a platform is provided which enables users to share content to be consumed by other users, but as such communities grow and the volume of contributed content expands, it becomes challenging to measure and weigh individual contributions of users as well as the output they generate. As a result, the existing solutions for efficiently organizing online content and users to improve the online community experience are extremely difficult at a practical level.

SUMMARY

Broadly speaking, selected embodiments of the present disclosure provide a method, system, and apparatus for self-organizing a community of online users to facilitate the generation of structured or semi-structured content (e.g., news articles or stories) by categorizing and/or classifying the content generated by contributing users, measuring or recording the quality of the content generated by contributing users, and using these quality evaluations to categorize, classify, and/or rank the expertise of the contributing users for promotion or demotion along a hierarchy of privileged community roles according to their ranked expertise. In selected embodiments, method and computer program product are provided for analyzing content contributions by content authors by selecting a content item (e.g., a story) from a contributor, evaluating the content item for subject matter categories, obtaining community feedback on the value of the content item from the contributor, determining a subject-based quality rating for the contributor based on the community feedback and/or contributor activity, and then ranking the contributor against other contributors in the subject area(s) to determine their relative positions in a hierarchy of privileged roles for the community.

The foregoing is a summary that is provided to introduce a selection of concepts in a simplified form that are further described hereinbelow and thus contains, by necessity, simplifications, generalizations, and omissions of detail; consequently, those skilled in the art will appreciate that the summary is illustrative only and is not intended to identify key factors or essential features of the claimed subject matter, nor is it intended to be used to limit the scope of the claimed subject matter. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
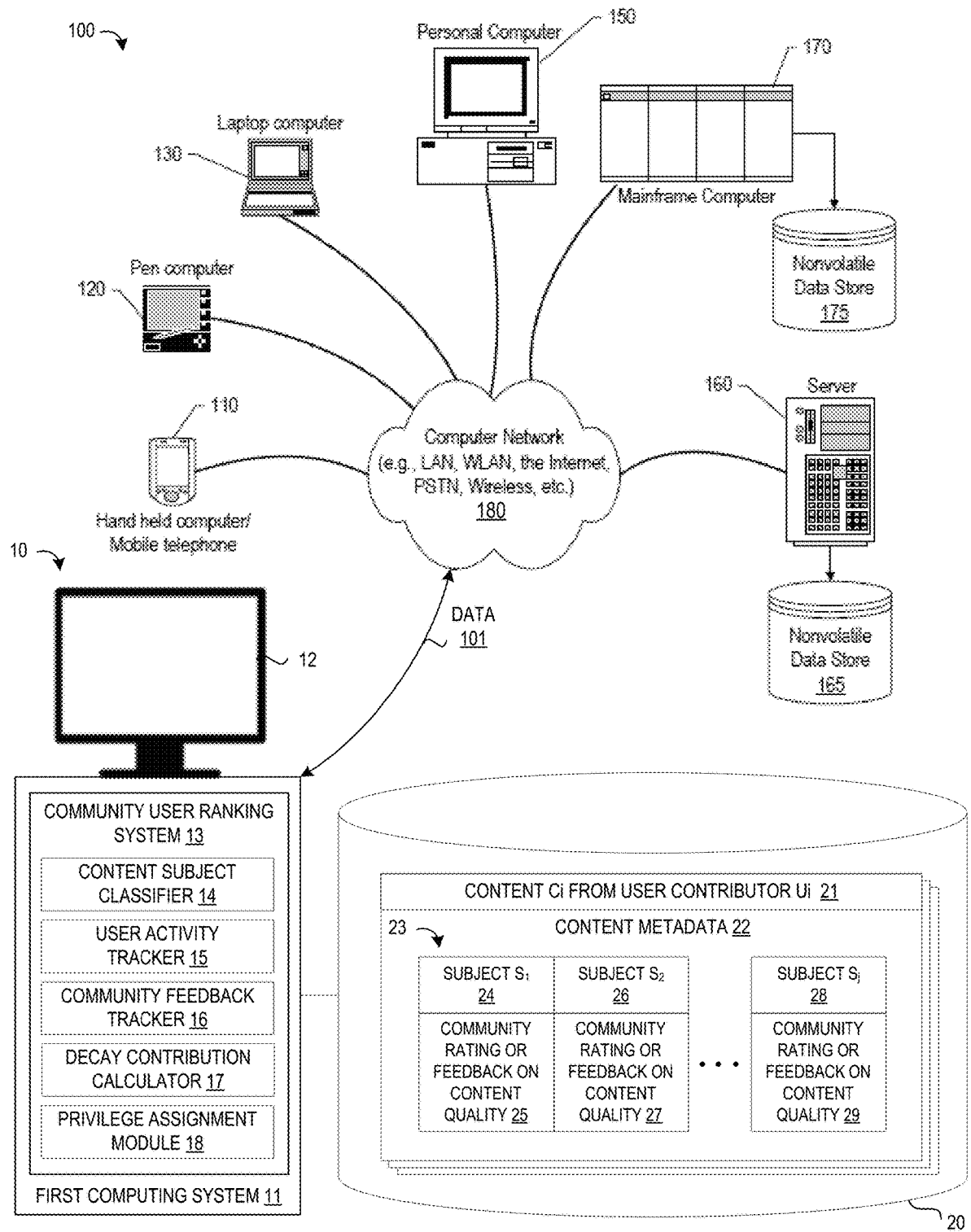
FIG. 1 depicts an example diagram of a distributed data processing system in which aspects of the illustrative embodiments may be implemented.

A method, system, apparatus, and a computer program product are provided for organizing an online community by assigning privileges based on community quality values for subject-related contributions. In the disclosed system and methodology, user contributions $C_i$ from a plurality of users in a community are classified according to a plurality of subjects $S_j$ to identify subjects in each user contribution. For each identified subject in each user contribution, one or more community quality values are assembled for each user that generated the user contribution. For each identified subject in each user contribution, the plurality of users are ranked based on the one or more community quality values for each user that generated the user contribution, and then for each identified subject in each user contribution, privileges are assigned to each user in a hierarchy of privileges based on the ranking of the plurality of users. In disclosing the claimed method and system for assigning privileges by using specific rules, rather than humans, to classify user contributions, assemble community quality values, rank users based on the assembled community values, and assign privileges to each user for each identified subject, there is disclosed an improvement in computer-related technology that previously could only be produced by humans, if at all.

The present invention may be a system, a method, and/or a computer program product. In addition, selected aspects of the present invention may take the form of an entirely hardware embodiment, an entirely software embodiment (including firmware, resident software, micro-code, etc.), or an embodiment combining software and/or hardware aspects that may all generally be referred to herein as a "circuit," "module" or "system." Furthermore, aspects of the present invention may take the form of computer program product embodied in a computer readable storage medium or media having computer readable program instructions thereon for causing a processor to carry out aspects of the present invention. Thus embodied, the disclosed system, a method, and/or a computer program product is operative to improve the functionality and operation of a data processing system for helping organize and rank a community of users based on the quality of content generated by contributing users and/or a measure of activity by the contributing users.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a Public Switched Circuit Network (PSTN), a packet-based network, a personal area network (PAN), a local area network (LAN), a wide area network (WAN), a wireless network, or any suitable combination thereof. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language, Hypertext Precursor (PHP), or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a sub-system, module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a distributed data processing system 100 having a network of computing devices (e.g., 110, 120, 130,

140, 150, 160, 170) connected over a network 180 to a data processing system 10 having a first computing system 11 and associated display screen 12. The depicted network 180 is the medium used to provide communication links between various devices and computers connected together within distributed data processing system 100, and may include one or more wired and/or wireless data communication links, where each communication link may comprise one or more of wires, fiber optic cables routers, switches, transmitters, receivers, or the like. At the data processing system 10, a community user ranking system 13 is configured to categorize content submissions from contributors, evaluate the quality of the content submissions based on the contributor's activity and/or community feedback, and the using these quality evaluations to categorize, classify, and/or rank the expertise of the contributors for promotion or demotion along a hierarchy of privileged community roles according to their ranked expertise. In some illustrative embodiments, first computing system 11 may be embodied as the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data stored in the knowledge base 20. Based on the application of the queries to the corpus of data, a set of hypotheses, or candidate answers to the input question, are generated by looking across the corpus of data for portions of the corpus of data that have some potential for containing a valuable response to the input question.

As shown in FIG. 1, the first computing system 11 may be embodied as a server computing device that is specifically configured to implement a community user ranking system 13. The configuring of the computing device may comprise the providing of application specific hardware, firmware, or the like to facilitate the performance of the operations and generation of the outputs described herein with regard to the illustrative embodiments. In addition or in the alternative, the configuring of the computing device may include storing software applications in one or more storage devices and loaded into memory of a computing device, such as server 10, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates the generation of structured or semi-structured content (e.g., news articles or stories) for an online community by ranking content contributors based on a measure of their expertise as perceived by the online community of interest, and then promoting or demoting each contributor along a hierarchy of privileged community roles according to their ranked expertise.

The community user ranking system 13 may evaluate a contributing author's expertise or importance to specific subject matter areas or categories of interest by applying natural language processing (NLP) techniques to identify one or more subject matter categories that are related by the content Ci from a user contributor Ui. To this end, the community user ranking system 13 may be provided with a content subject classifier 14 for identifying subject matter categories 24, 26, 28 (e.g., Subject S1, Subject S2, . . . Subject Sj) that are related to the selected content Ci for storage in the memory/database storage 20. For example, if a contributor creates, assembles, rearranges, modifies, and/or adds a story about ground water rights in Namibia, the content subject classifier 14 may determine that the story is related to the following content categories: African Politics, Africa, Namibia, Namibian Politics, and Politics. However, if the contributor creates a second story about drilling off the coast of France, the content subject classifier 14 may determine that the second story is related to the following contents: France, French Politics, Europe, European Politics, Politics, Off Shore Drilling, and Oil.

The community user ranking system 13 may also monitor the activity of each contributor Ui (e.g., the frequency, volume, quality, and/or degree of creation or modification activity by the contributor Ui) for possible use in evaluating the significance of the contributor. To this end, the community user ranking system 13 may be provided with a user activity tracker 15 for identifying the relative level of activity and expertise in each subject matter category or area, such as by keeping track of the number of stories created by the contributor Ui, the number of stories modified by the contributor Ui, the degree of creation/modification activity by the contributor Ui, and the like. In addition or in the alternative, the community user ranking system 13 may be provided with a community feedback tracker 16 for recording community rating or feedback indications about the quality of the content generated by content Ci, such as by keeping track of the positive community feedback (e.g., "likes" or "upvotes" or "retweets" or positive comments) and negative community feedback (e.g., "dislikes" or "downvotes" or negative comments) generated in response to the content Ci created by the contributor Ui. In the example of a user Ui who creates a story about ground water rights in Namibia, the community feedback tracker 16 credits the user Ui with positive or negative feedback from the community for all of the subject matter categories associated with that story. In selected embodiments, the credits may be allocated proportionally or on a discounted basis to adjacent or related subject matter categories which are not directly relevant to the story (e.g., Mining Technologies, Energy Technologies, Renewable Energy, etc.), depending on the degree of relatedness in the subject matter category. The tracked user activity and community feedback 25, 27, 29 associated with each identified subject matter category 24, 26, 28 may be stored in the memory/database storage 20 in a structured metadata structure 22 for each content Ci from a user contributor Ui 21.

Using the content values described above and stored in the content metadata 22, the community user ranking system 13 may rank the expertise or importance of the authors Ui of the content Ci. To this end, the community user ranking system 13 may use an aggregated formula to score authors based on the metrics and attributes of the content that they have contributed to the community. The resulting author rankings may allow identification of the top experts in a community based on who is contributing the most value over a given period of time. In one embodiment, authors are ranked by determining the value of each of their posts based on the community feedback and other indicia of user activity. In selected embodiments, the ranking process employs a decay contribution calculator 17 which enables continuing activity by an author Ui to be rewarded along with some attenuated (or "decayed") acknowledgement of past contributions from the author. For example, the decay contribution calculator 17 may be invoked at predetermined or regular intervals to compute the sum of a quality metric for current contributions (e.g., contributions made by the user Ui since the last ranking computation) and a decayed or discounted quality metric for past contributions (e.g., by applying an exponential decay term to a quality metric for past contributions by the user Ui).

In selected embodiments, the community user ranking system 13 is operative to evaluate a hierarchy of users on the basis of their respective expertise rankings in each subject matter category so that users are promoted and demoted based on a combination of their past contributions and current contributions to each category since the last evaluation. To this end, the community user ranking system 13 may be provided with a privilege assignment module 18 for adding or removing privileges for each user Ui based on their expertise ranking. As a result, the ranking for each user Ui in a community for a subject matter category determines their access and and/or administrative privileges for adding or removing categorizations or classifications in that category. In other embodiments, the users in the community are assigned access or administrative rights for stories according to their rank or level in the hierarchy of users. For example, if a user Ui comes across a story on Namibian politics, the user will have access/admin rights to modify, change, categorize, and delete the story based on their own level of expertise as determined by the community.

Thus, as shown in FIG. 1, the community user ranking system 13 may include a content subject classifier 14, a user activity tracker 15, a community feedback tracker 16, a decay contribution calculator 17, and a privilege assignment module 18. The content subject classifier 14 comprises logic to perform operations, as described in more detail hereafter, for categorizing and classifying generated content. The user activity tracker 15 comprises logic to perform operations, as described in more detail hereafter, for assessing the relative level of activity by each user or author. The self a community feedback tracker 16 comprises logic to perform operations, as described in more detail hereafter, for assessing quality indications for the generated content received in feedback from the community. The decay contribution calculator 17 comprises logic to perform operations, as described in more detail hereafter, for ranking each user or contributor with subject-based quality ratings for the user's past contributions and current contributions to each category. The privilege assignment module 18 comprises logic to perform operations, as described in more detail hereafter, for assignment admin/access privileges to each user or contributor for stories according to their subject-based quality rating.

As noted above, the mechanisms of the illustrative embodiments utilize specifically configured computing devices, or data processing systems, to perform the operations for assigning administrative or access privileges to users based on the community feedback which specifies the user's ranking or expertise. These computing devices, or data processing systems, may comprise various hardware elements which are specifically configured, either through hardware configuration, software configuration, or a combination of hardware and software configuration, to implement one or more of the systems/subsystems described herein. For example, selected embodiments of the present disclosure can be implemented in whole or in part with different types of information handling systems that can range from small handheld devices, such as the handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, server 160, and mainframe computer 170. As shown, the various information handling systems can be networked together using computer network 180. Types of computer network 180 that can be used to interconnect the various information handling systems include Personal Area Networks (PANs), Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores. For example, server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
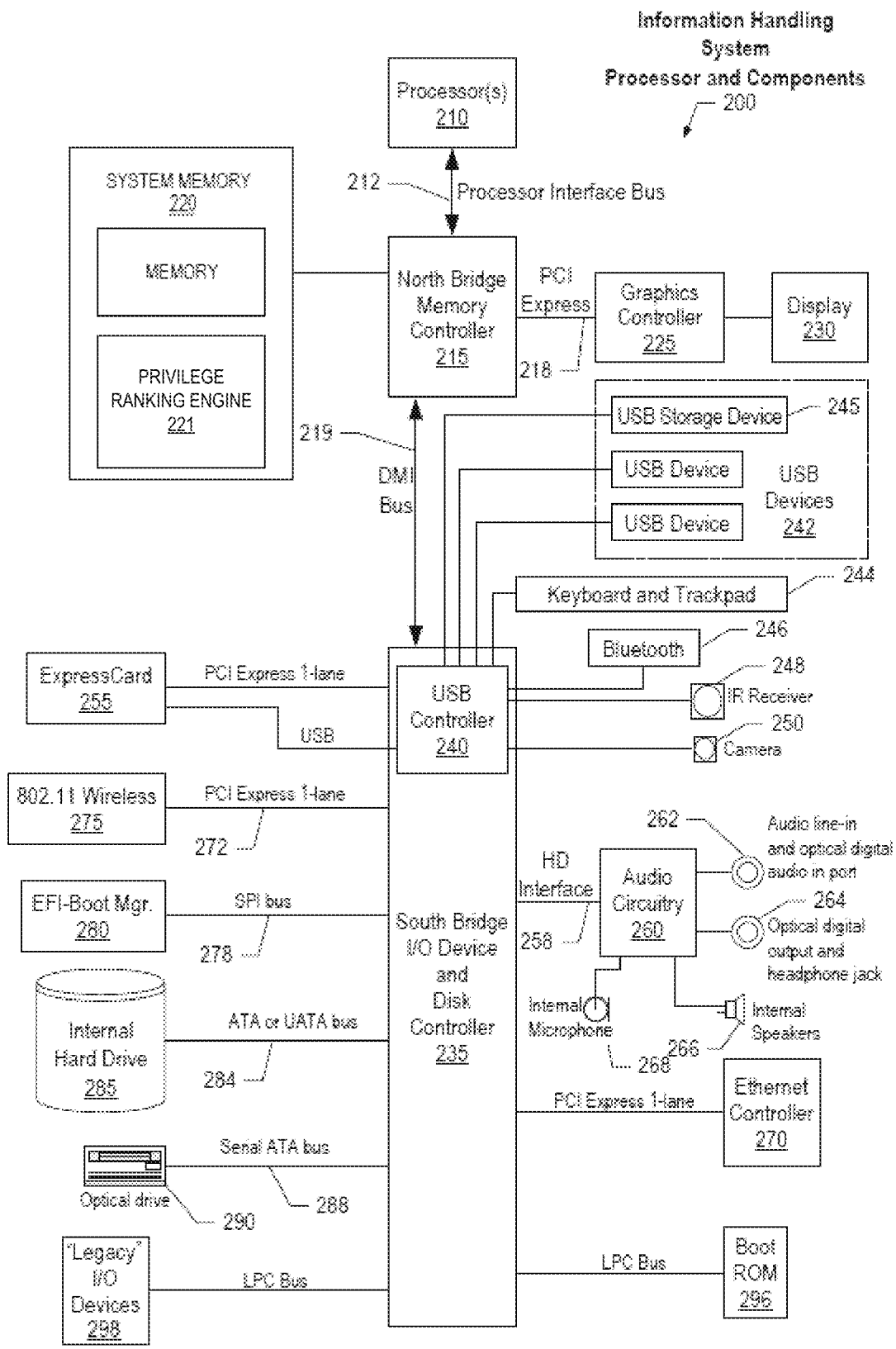
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. In the system memory 220, a variety of programs may be stored in one or more memory devices, including a privilege ranking engine 221 which may be invoked to categorize structured or semi-structured content from contributing users, measure the quality of the content based on community feedback and measured activity of contributing users, and using these quality measurements to rank the expertise of the contributing users within a hierarchy of privileged community roles according to their ranked expertise. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etc.

Wireless Local Area Network (LAN) device 275 connects to Southbridge 235 via the PCI or PCI Express bus 272. LAN device 275 typically implements one of the IEEE 802.11 standards for over-the-air modulation techniques to wireless communicate between information handling system 200 and another computer system or device. Extensible Firmware Interface (EFI) manager 280 connects to Southbridge 235 via Serial Peripheral Interface (SPI) bus 278 and is used to interface between an operating system and platform firmware. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, an information handling system need not necessarily embody the north bridge/south bridge controller architecture, as it will be appreciated that other architectures may also be employed.

Figure 3:
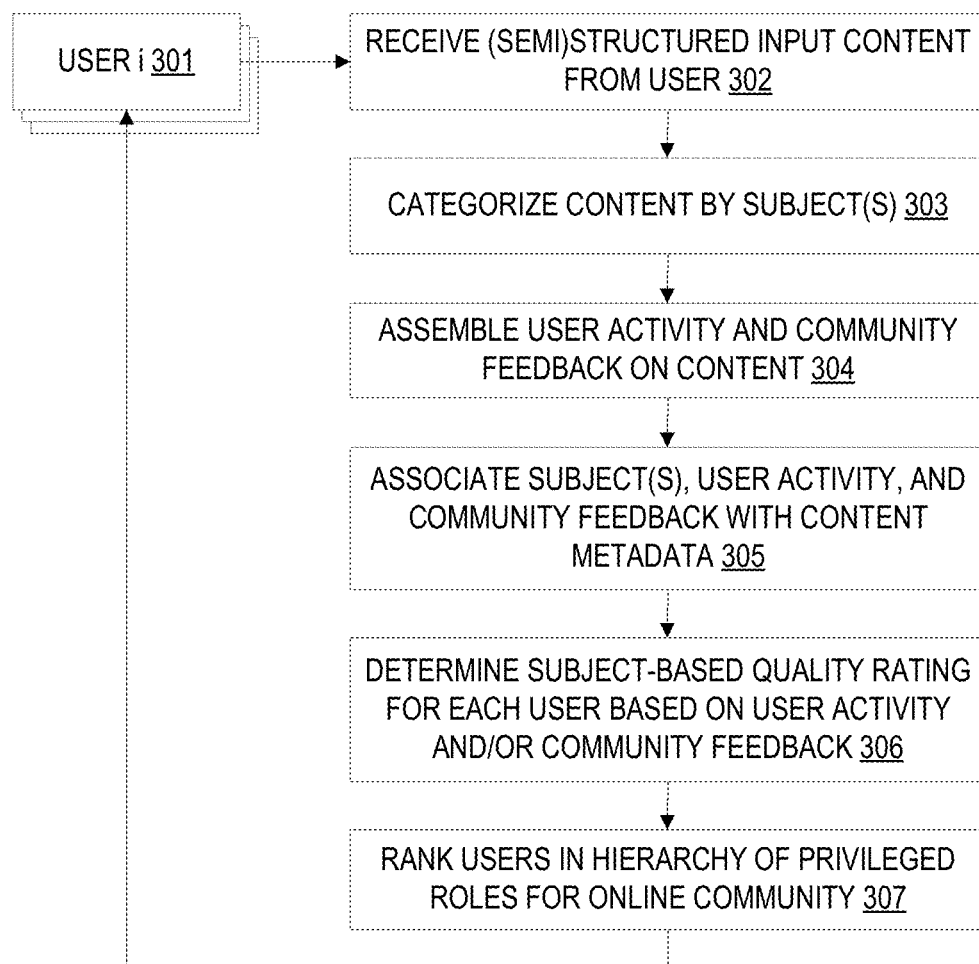
FIG. 3 illustrates a simplified flow chart showing the logic for organizing an online community of news content readers and authors in accordance selected embodiments of the present disclosure.

To provide additional details for an improved understanding of selected embodiments of the present disclosure, reference is now made to FIG. 3 which depicts a simplified flow chart 300 showing the logic for organizing an online community of news content readers and authors in accordance selected embodiments of the present disclosure. The processing shown in FIG. 3 may be performed by a cognitive system, such as the first computing system 14 or other natural language processing system. In an online community including a plurality of users 301 (e.g., User 1-User i), content provided by one or more users may be received as structured or semi-structured content (step 302). In an example embodiment, the received content may be virtual page representing a collaborative Watson or community-based explanation of a trending topic in the news, and the user's contribution to the content may include assembling, rearranging, modifying, and/or adding to the content of the story.

At step 303, the content is categorized or classified into one or more subject matter categories relating to the content. The processing performed at step 303 may use natural language processing techniques to parse and classify the story into related subject matter categories. In selected embodiments, the categorization process at step 303 identifies not only subject matter categories that are directly related topics, but may also identify adjacent subject matter categories that have a reduced degree of relatedness.

At step 304, user activity and community feedback on the content are assembled. The assembled user activity may include the number of stories created by the contributing user, the number of stores modified by the contributing user, and/or the degree of creation or modification activity by the contributing user. To some extent the user activity provides an indication of the expertise or significance of the contributing user such that frequent contributors are seen as having more expertise in the specific subject matter category area.

To obtain additional indicia of expertise, the community feedback may be solicited at step 304 to provide an indication of the quality of the user's contribution. To this end, users of the community may be queried as to the value of a user's contributed content. As will be appreciated, the content items evaluated by the community may vary based on the type of online community and the type of content contributed. For example, where the online community is a forum or bulletin board, the content items may include posts, threads, or uploaded content. Where the online community is a file sharing service, content items may include files. Where the online community is a photo-sharing site, the content items may include digital images. Where the online community is a news aggregator, the content items may include news items. Where the online community provides a collaboratively edited environment such as a wiki, the content items may include individual edits or contributions. Where the online community is a social networking service, content items may include posts or connection invitations. In addition to the exemplary content items described above, the subject matter of the present disclosure is applicable to arbitrary content items contributed to online communities.

In some embodiments, users are queried through a voting mechanism, in which they are asked to vote for the best n content items. In other embodiments, the user is asked to assign a numeric or descriptive value to the individual content item with regard to a given criterion (e.g., relevance, usefulness, quality). In yet other embodiments, the user is asked to indicate simply whether the post was helpful or unhelpful, liked or disliked, or some other binary classifier. Additional community rating or feedback mechanisms on the quality of the use's contribution may include "likes," "upvotes," "retweets," "dislikes," "downvotes" or positive or negative comments. In some embodiments, users are regularly asked to vote on the value that a post represents to them with respect to one or more specified criteria indicating the relevance of a post to the user's work. The collection of community feedback may also include the collection of implicit metrics for the posts on which users have voted, including but not limited to intrinsic attributes of the content (e.g., age, size, topics and keywords), attributes indirectly affected by user behavior (e.g., the number of recommendations received, the number of comments made in reply to a post, the number of times the content was shared to other communities or feeds, etc.).

At step 305, the identified subject matter categories for each contributing user may be associated with the user's activity and community feedback, and then stored with the metadata of the user's story. For example, a user's contributed story on a specific topic, such as politics in Namibia, includes metadata identifying this user as being highly active in topics related to Namibia. However, it will be appreciated that the metadata storage step at 305 may be skipped in selected real time processing embodiments.

At step 306, subject-based quality ratings may be determined for each contributing user based on the user activity and/or community feedback. The processing performed at step 306 may be performed at regular or predetermined intervals to evaluate a hierarchy of users so that contributing members to each subject matter category are ranked using a formula that rewards continuing activity by contributing users while also acknowledging each contributing user's past contributions. In selected embodiments, the quality rating formula assigns or computes a numerical score Rc for the contributing user's current contributions for a given subject matter category (e.g., the contributions since the most recent calculation of the quality rating) based on the indications of subject matter expertise from the assembled user activity and/or community feedback data. In addition, the quality rating formula may apply an exponential decay term to a numerical score Ro for the contributing user's previous contributions to the specified subject matter category (e.g., the previously computed quality rating numerical score), thereby assigning or computing a contributing, decayed value for past contributions.

As will be appreciated, any suitable quality rating formula may be created manually or automatically by a software module. In an example embodiment, the quality rating formula used at step 306 may be computed as:

$$RC(t)=Ro*e\char`\^(-\lambda*\lambda C*\lambda A*\text{time})+Rc$$

where RC(t) is contribution score for a subject matter category at time t that is computed as the sum of Rc (the user's current contributions to the subject matter category) and the product of Ro (the previously computed user contribution quality metric score for the subject matter category) and the exponential decay term, $e\char`\^(-\lambda*\lambda C*\lambda A*\text{time})$. In this example, the exponential decay term includes the product of the exponential decay constant $\lambda$ (lambda) and the time period t (since the previous ranking) that is modified or multiplied by a first modifier term $\lambda C$ which is applied for categories that may deteriorate at a different rate than others. In addition or in the alternative, the exponential decay constant $\lambda$ and time period t may be modified or multiplied by a second modifier term $\lambda A$ which is applied as an activity modifier for categories where the contributions may decay at a faster or slower rate, depending on the historical activity of the user.

In another example embodiment, the quality rating formula used at step 306 may be computed using a minimum or floor value for the deterioration in past contributions, in which case the contribution score RC(t) is computed as the sum of Rc and the greater of $Ro*e\char`\^(-\lambda*\lambda C*\lambda A*\text{time})$ and FLOOR, whichever has the greater value. With this approach, the subject-based quality rating has a minimum or FLOOR value which reflects the expertise accumulated from the contributing user's previous contributions, regardless of how long ago they were.

Once the quality rating formula has been determined, it is applied to all content generated by contributing users in the community to assign a numeric quality value to each contributing user so that they can be ranked in a hierarchy of privileged roles for the community (step 307). In this manner, the quality rating values described above can be used to rank the authors of content with an aggregated formula to score authors based on the metrics and attributes of the content that they have contributed to the community. For example, the following aggregated value formula may be computed for each content item x contributed by author a:

$$\text{value}(a)=0.8\ \log(\Sigma_x V(x)+1)+1)+0.8\ \log(\Sigma_x R(x)+1)+1)+0.8\ \log(\Sigma_x C(x)+1),$$

where V, R, and C are each functions that return the number of views, recommendation, and comments by a post, X, respectively.

At step 307, the resulting author rankings are fed back to the users 301 to identify the top experts in a community for a subject matter category based on who is contributing the most value over a given period of time. In one embodiment, authors are ranked by totaling the value of each of their posts in each subject matter category area. By ranking each author based on explicit user feedback (in the form of votes and surveys) that is combined with content metrics and attributes (such as number of views, number of comments, and keywords), each contributing user or author may be assigned access/admin rights for stories based on these categories comparable to their level in the hierarchy of users. For example, if a user comes across a story on Namibian politics, the user will have access/admin rights to modify, change, categorize, and delete it based on their own level of expertise as determined by the community.

An existing online community may be modified to include a software module operable to apply ranking and assign privilege roles according to the present disclosure. For example, a software module may be installed accesses a database of the online community either directly or through a community specific API to read content items and contributor information. The software module may interact with the existing user interface of the online community to present feedback queries to users of the online community. For example, supplemental user interface elements may be provided to query a user upon login or upon viewing a content item. In some embodiments, the supplemental user interface elements may request a numeric value from the user, whether by direct entry or by selection of representative objects such as stars. In some embodiments, the supplemental user interface elements may be presented in a popup, a dialog box, or inline in a web page.

As disclosed herein, illustrative embodiments provide mechanisms for promoting or demoting community members within a hierarchy of privileged community roles based on an expertise ranking that is derived for each subject matter category from user activity and/or community feedback. As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

By now, it will be appreciated that there is disclosed herein a system, method, apparatus, and computer program product for organizing a community based on community quality values for subject-related contributions at an information handling system having a processor and a memory. As disclosed, the system, method, apparatus, and computer program classify user contributions Ci from a plurality of users in a community according to a plurality of subjects Sj to identify subjects in each user contribution. Subsequently for each identified subject in each user contribution, the information handling system assembles one or more community quality values for each user that generated the user contribution. In selected embodiments, the information handling system may assemble community quality values by monitoring user creation or modification activity for each of the plurality of users. In other embodiments, the information handling system may assemble community quality values by querying a user in the community to obtain a community feedback value. In yet other embodiments, the information handling system may assemble community quality values by monitoring user activity in the community, such as by monitoring a number of recommendations received, monitoring a number of comments made in reply, monitoring a number of times viewed, monitoring a number of times shared, monitoring a number of "upvotes" or "downvotes," monitoring a number of "likes" or "dislikes," and/or monitoring a number of "retweets. The information handling system also ranks, for each identified subject in each user contribution, the plurality of users based on the one or more community quality values for each user that generated the user contribution. In selected embodiments, the plurality of users may be ranked by computing, for each identified subject in each user contribution, a subject-based quality rating for each user as a sum of a first contribution score based on community quality values for each user's recent contributions to the identified subject and a second contribution score based on community quality values for the user's past contributions to the identified subject; and then by sorting the plurality of users based on the subject-based quality ratings. In selected embodiments, the second contribution score may be computed as a product of an exponential decay term and a previously computed contribution score for the user's past contributions to the identified subject. In other embodiments, the second contribution score may be computed as the greater of a predetermined minimum floor value and a product of an exponential decay term and a previously computed contribution score for the user's past contributions to the identified subject. Finally, the information handling system assigns, for each identified subject in each user contribution, privileges to each user in a hierarchy of privileges based on the ranking of the plurality of users. In selected embodiments, the privileges may be assigned to each user bh promoting or demoting a user in the hierarchy of privileges based on the ranking of the plurality of users to control the user's administrative access for removing, reorganizing, and customizing content related to the plurality of subjects Sj.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for organizing a community based on community quality values for subject-related contributions, comprising:

classifying, by an information handling system comprising a processor and a memory, user contributions Ci from a plurality of users in a community according to a plurality of subjects Sj to identify subjects in each user contribution;

for each identified subject in each user contribution, assembling, by the information handling system, one or more community quality values for each user that generated the user contribution by monitoring a number of recommendations received, monitoring a number of comments made in reply, monitoring a number of times viewed, monitoring a number of times shared, monitoring a number of "upvotes" or "downvotes," monitoring a number of "likes" or "dislikes," and monitoring a number of "retweets";

for each identified subject in each user contribution, ranking, by the information handling system, the plurality of users based on the one or more community quality values for each user that generated the user contribution; and assigning for each identified subject in each user contribution, by the information handling system, automated access privileges to each user in a hierarchy of privileges based on the ranking of the plurality of users, where each level in the hierarchy of privileges specifies an assigned user's access for removing, reorganizing, customizing, and classifying user contributions Ci from the plurality of users to the identified subject.

2. The method of claim 1, where assembling one or more community quality values comprises monitoring user creation or modification activity for each of the plurality of users.

3. The method of claim 1, where assembling one or more community quality values comprises querying a user in the community to obtain a community feedback value.

4. The method of claim 1, where ranking the plurality of users comprises:
for each identified subject in each user contribution, computing, by the information handling system, a subject-based quality rating for each user as a sum of a first contribution score based on community quality values for each user's recent contributions to the identified subject and a second contribution score based on community quality values for the user's past contributions to the identified subject; and
sorting, by the information handling system, the plurality of users based on the subject-based quality ratings.

5. The method of claim 4, where computing the subject-based quality rating comprises computing the second contribution score as a product of an exponential decay term and a previously-computed contribution score for the user's past contributions to the identified subject.

6. The method of claim 4, where computing the subject-based quality rating comprises computing the second contribution score as the greater of a predetermined minimum floor value and a product of an exponential decay term and a previously computed contribution score for the user's past contributions to the identified subject.

7. The method of claim 1, where assigning automated access privileges to each user comprises promoting or demoting a user in the hierarchy of privileges based on the ranking of the plurality of users to control the user's access privilege for removing, reorganizing, customizing, and classifying content related to the plurality of subjects Sj.

8. A computer program product comprising a computer readable storage medium having a computer readable program stored therein, wherein the computer readable program, when executed on an information handling system, causes the system to assign access privileges in an online community by:
classifying user contributions Ci from a plurality of users in a community according to a plurality of subjects Sj to identify subjects in each user contribution;
for each identified subject in each user contribution, assembling one or more community quality values for each user that generated the user contribution by monitoring a number of recommendations received, monitoring a number of comments made in reply, monitoring a number of times viewed, monitoring a number of times shared, monitoring a number of "upvotes" or "downvotes," monitoring a number of "likes" or "dislikes," and monitoring a number of "retweets";
for each identified subject in each user contribution, ranking the plurality of users based on the one or more community quality values for each user that generated the user contribution; and
assigning, for each identified subject in each user contribution, automated access privileges to each user in a hierarchy of privileges based on the ranking of the plurality of users, where each level in the hierarchy of privileges specifies an assigned user's access for removing, reorganizing, customizing, and classifying user contributions Ci from the plurality of users to the identified subject.

9. The computer program product of claim 8, wherein the computer readable program, when executed on the system, causes the system to assemble one or more community quality values by monitoring user creation or modification activity for each of the plurality of users.

10. The computer program product of claim 8, wherein the computer readable program, when executed on the system, causes the system to assemble one or more community quality values by querying a user in the community to obtain a community feedback value.

11. The computer program product of claim 8, wherein the computer readable program, when executed on the system, causes the system to rank the plurality of users by:
computing, for each identified subject in each user contribution, a subject-based quality rating for each user as a sum of a first contribution score based on community quality values for each user's recent contributions to the identified subject and a second contribution score based on community quality values for the user's past contributions to the identified subject; and
sorting the plurality of users based on the subject-based quality ratings.

12. The computer program product of claim 11, wherein the computer readable program, when executed on the system, causes the system to compute the subject-based quality rating by computing the second contribution score as a product of an exponential decay term and a previously-computed contribution score for the user's past contributions to the identified subject.

13. The computer program product of claim 11, wherein the computer readable program, when executed on the system, causes the system to compute the subject-based quality rating by computing the second contribution score as the greater of a predetermined minimum floor value and a product of an exponential decay term and a previously computed contribution score for the user's past contributions to the identified subject.

14. The computer program product of claim 8, wherein the computer readable program, when executed on the system, causes the system to assign automated access privileges to each user by promoting or demoting a user in the hierarchy of privileges based on the ranking of the plurality of users to control the user's automated access privilege for removing, reorganizing, customizing, and classifying content related to the plurality of subjects Sj.

15. An information handling system comprising:
one or more processors;
a memory coupled to at least one of the processors;
a set of instructions stored in the memory and executed by at least one of the processors to assign access privileges in an online community, wherein the set of instructions are executable to perform actions of:

classifying, by the system, user contributions Ci from a plurality of users in a community according to a plurality of subjects Sj to identify subjects in each user contribution;

for each identified subject in each user contribution, assembling, by the system, one or more community quality values for each user that generated the user contribution by monitoring a number of recommendations received, monitoring a number of comments made in reply, monitoring a number of times viewed, monitoring a number of times shared, monitoring a number of "upvotes" or "downvotes," monitoring a number of "likes" or "dislikes," and monitoring a number of "retweets";

for each identified subject in each user contribution, ranking, by the system, the plurality of users based on the one or more community quality values for each user that generated the user contribution; and assigning for each identified subject in each user contribution, by the system, automated access privileges to each user in a hierarchy of privileges based on the ranking of the plurality of users, where each level in the hierarchy of privileges specifies an assigned user's access for removing, reorganizing, customizing, and classifying user contributions Ci from the plurality of users to the identified subject.

16. The information handling system of claim 15, where assembling one or more community quality values for each user that generated the user contribution comprises:

monitoring user creation or modification activity for each of the plurality of users;

querying a user in the community to obtain a community feedback value in response to the user contribution;

monitoring a number of recommendations received for the user contribution;

monitoring a number of comments made in reply to the user contribution;

monitoring a number of times that the user contribution is viewed;

monitoring a number of times that the user contribution is shared;

monitoring a number of "upvotes" or "downvotes" for the user contribution;

monitoring a number of "likes" or "dislikes" for the user contribution; and monitoring a number of "retweets" for the user contribution.

17. The information handling system of claim 15, where ranking the plurality of users comprises:

for each identified subject in each user contribution, computing, by the system, a subject-based quality rating for each user as a sum of a first contribution score based on community quality values for each user's recent contributions to the identified subject and a second contribution score based on community quality values for the user's past contributions to the identified subject; and sorting, by the system, the plurality of users based on the subject-based quality ratings.

18. The information handling system of claim 15, where assigning automated access privileges to each user comprises promoting or demoting a user in the hierarchy of privileges based on the ranking of the plurality of users to control the user's automated access privilege for removing, reorganizing, customizing, and classifying content related to the plurality of subjects Sj.

\* \* \* \* \*